United States Patent [19]

Bodde

[11] 4,183,076
[45] Jan. 8, 1980

[54] LIGHT INDICATOR FOR FISHING TIP-UPS

[76] Inventor: Egbert J. Bodde, Rte. 1, Trego, Wis. 54888

[21] Appl. No.: 918,641

[22] Filed: Jun. 23, 1978

[51] Int. Cl.² ............................................. B25B 23/18
[52] U.S. Cl. .................................... 362/120; 362/191; 362/431
[58] Field of Search ................ 362/120, 190, 191, 431

[56] References Cited
U.S. PATENT DOCUMENTS
2,732,543  1/1956  Mogren .............................. 362/190 X

*Primary Examiner*—Stephen J. Lechert, Jr.
*Attorney, Agent, or Firm*—Schroeder, Siegfried, Ryan, Vidas, Steffey & Arrett

[57] ABSTRACT

A tip-up light having no moving parts for use with ice fishing tip-ups.

11 Claims, 4 Drawing Figures

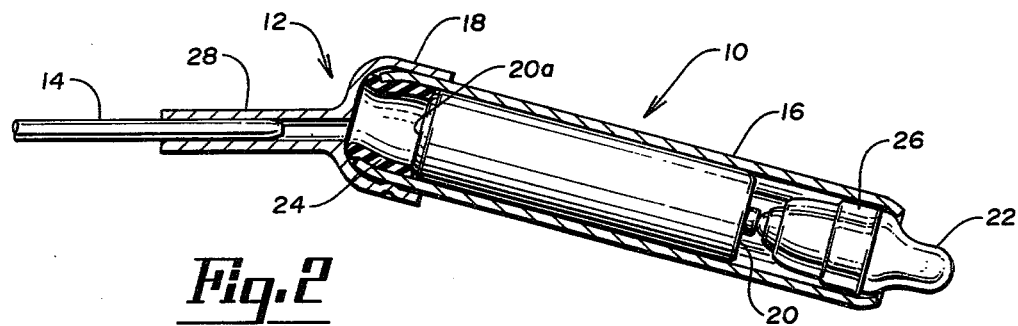
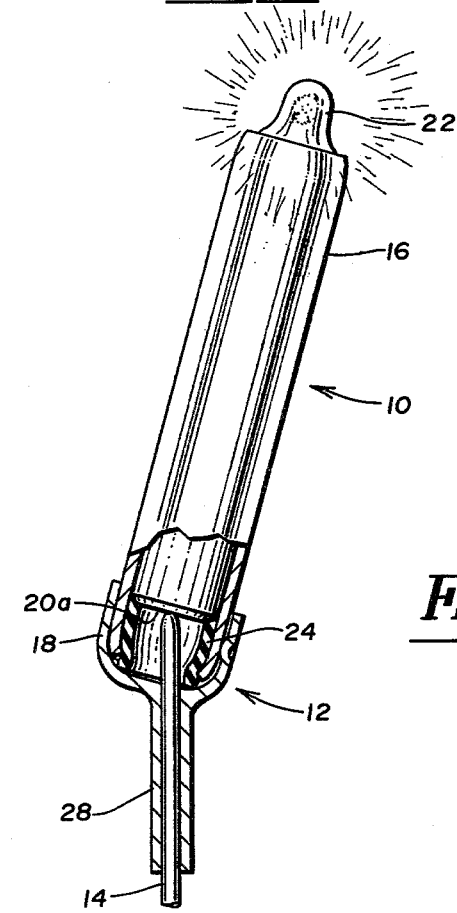
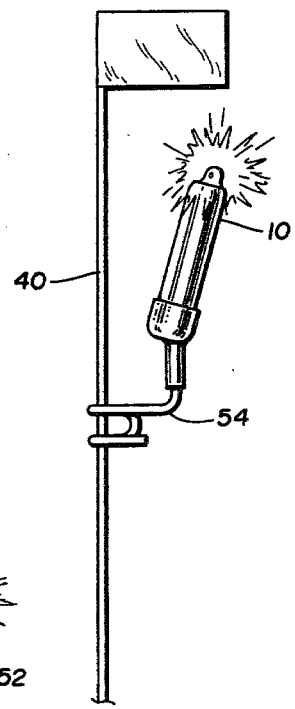
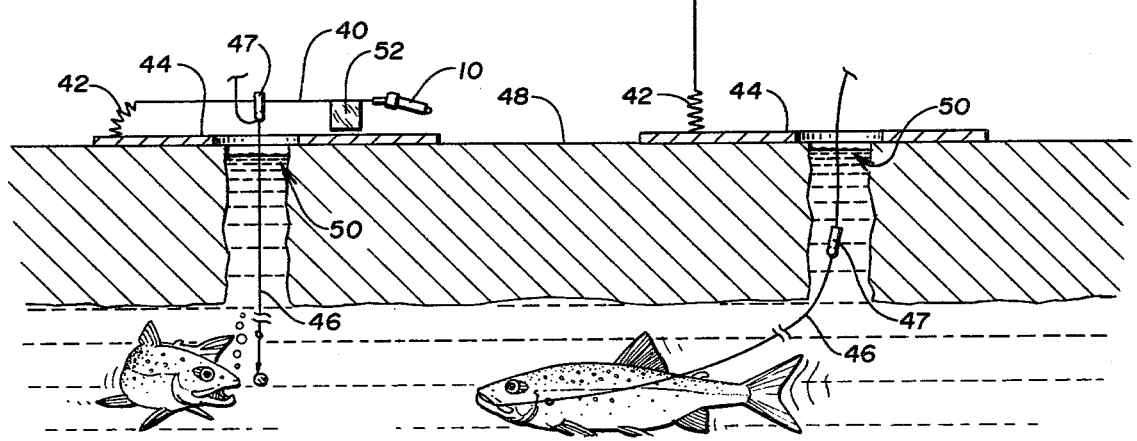

LIGHT INDICATOR FOR FISHING TIP-UPS

BACKGROUND OF THE INVENTION

This invention relates to a fish-bite signaling device and has reference, more particularly, to a light signaling device which may be readily attached to the tip-up of an ice fishing rig. The invention comprises an attachment for a conventional-type ice fishing tip-up, said attachment employing a specially adapted flashlight-like device and using the source of light as a visual signal, the light being normally off but coming on automatically when a fish has made a strike at a baited hook on the rig and activated the signal arm of the tip-up rig.

SUMMARY OF THE INVENTION

In carrying out the preferred embodiment of the invention, a comparatively simple flashlight-like device is used. It is adapted according to the invention by the provision of an especially oriented combination mounting guide and contact means by which the flashlight device is slidably and removably carried on a conductive extension or tip of the signal arm tip-up. When the tip-up moves to the "bite" signaling position, the flashlight slides downwardly on the conductive tip and the bulb is energized and lighted.

Various objects, features, and advantages of the invention will be readily apparent from the following description and the accompanying illustrative drawings.

BRIEF DESCRIPTION OF THE DRAWINGS

FIG. 1 is a side elevational view in cross section showing the tip-up light of the invention in the normal "baited" position, i.e. the position in which the ice fishing rig signal arm and conductive tip or extension are substantially in a horizontal position and the flashlight bulb is not energized.

FIG. 2 is a view similar to that of FIG. 1 in which the tip-up is in the signaling position and the bulb is illuminated due to the contact of the tip-up tip with the combination guide and contact means of the flashlight and with the end of the battery to complete an energizing circuit to the bulb.

FIG. 3 is a schematic showing of the light indicator of the invention mounted on an ice fishing rig of the Arctic tip-up type, in both the "baited" position and the "signaling" position.

FIG. 4 shows an alternate method for mounting the indicator device, making it adaptable for most tip-up rigs.

Description of the Preferred Embodiments

In FIG. 1 the bite signaling device of the invention is shown. It comprises a flashlight generally indicated at 10 and means generally indicated at 12 for attaching the flashlight to an ice fishing tip-up rig (not shown). More specifically, means 12 comprises a combination guide and contact means by which a conductive extension or tip 14 may be used for removably and slidably mounting flashlight 10 on the ice fishing rig to be carried thereby between the normally "baited" or substantially horizontal position of the rig and the signaling or substantially upright position thereof, as will be discussed in more detail hereinbelow.

Flashlight 10 includes a housing 16, usually a metal tubular body which is electrically conductive. There is a closure member 18, usually an end-cap, which is electrically conductive and in contact with housing 16. A battery 20 is carried inside housing 16 in contact and cooperation with a bulb 22 for energizing or illuminating the same when an electrical circuit is completed between the bulb and battery. Battery 20 is insulated from housing 16 by means of the typical battery wrapping. However, the exposed end 20a of battery 20 is separated from closure member 18 by means of a rubber washer 24. The base 26 of bulb 22 contacts conductive housing 16 as shown in the Figures.

Consequently, in such an arrangement with the base 26 of bulb 22 contacting housing 16 and housing 16 contacting closure member 18 and with battery 20 contacting bulb 22 but separated from housing 16 and closure member 18, an open circuit condition is presented by the flashlight under normal circumstances such as those shown in FIG. 1.

Closure member 18 includes as a portion of its structure the preferably integral combination guide and contact means generally designated at 12. Preferably means 12 will take the form as shown in FIGS. 1 and 2 of a conduit extension 28 which provides access through closure member 18 to the exposed end 20a of battery 20. Consequently, the insertion of a conductive elongated object such as tip 14 into conduit 28 through closure member 18 and against battery end 20a will when contact is also made against the inner walls of conduit 28 complete an electrical circuit throughout the flashlight between battery 20 and bulb 22 will energize the bulb and cause it to be illuminated.

Combination guide and contact means 12 will extend outwardly from closure member 18 and away from battery end 20a preferably at an angle relative to the longitudinal axis of the flashlight. More preferably, the angle will be intermediate the longitudinal axis of the flashlight and a plane normal to the flashlight body as is shown in FIGS. 1 and 2. Such an angular extension allows the device to be readily mounted and retained on the signal arm of an ice rig in both the "baited" and "signal" positions. Furthermore, the angle prevents the device from hitting a perfect "plumb" on 14 which might interfere with the making of contact between battery end 20a and 14.

Referring now to FIG. 3, there is shown an ice fishing tip-up rig of the "Arctic" type carrying the signal device of the invention in both the "baited" position and the upright "signal" position. As is shown to the left of the figure, when signal arm 40 is placed in the "baited" or substantially horizontal position by bending spring 42, by means of which the signal arm is attached to base or board member 44, the signal arm may be latched to the fishing line 46, as indicated at 47. The entire rig is placed on the ice 48 over a fishing hole 50 cut therethrough. The indicator 10 is slipped over the metal end of signal arm 40 as shown with the tip of the arm out of contact with the end 20a of battery 16. This is shown in detail in FIG. 1. When a fish strikes line 46 and releases the latching mechanism, spring 42 urges signal arm 40 into an upright or signaling position. As a consequence, flashlight 10 slides downwardly on the conductive tip of signal arm 40 bringing the battery end 20a into contact with the tip, which as previously described is also in contact with the guide means and closure 18, whereby the circuit is completed and the bulb of the flashlight is energized.

No moving parts are used with the signal device and, to mount it, it is simply slipped over the end of the signal arm 40 and preferably pulled away, typically about a quarter of an inch, when the tip up is set. When a fish strikes the bait line 46, the fisherman may simply remove the signaling device and place it in his pocket before handling the line. As is shown in FIG. 3, the typical tip-up will also include a signal flag 52 for daylight use.

FIG. 4 shows schematically an adaptation for using the signal device with tip-ups other than the Arctic type. In this arrangement, a metal bracket 54 is simply clipped to the signal arm 40 and the signal device flashlight 10 is mounted on the conductive tip thereof in a manner similar to that described hereinabove for the Arctic tip-up arrangement.

The foregoing is illustrative of the invention and the exclusive rights pertaining thereto are defined by the following claims.

What is claimed is:

1. A fish bite indicator to be carried and energized by the signal arm of an ice fishing rig having a normal "baited" position and a substantially upright "bite" signaling position, the bite indicator comprising a flashlight including a housing having at least a portion thereof electrically conductive; a normally de-energized bulb electrically contacting the conductive portion of the housing; a battery in the housing cooperating with the bulb; a closure member at one end of the housing having at least a portion thereof electrically conductive and in contact with the conductive portion of the housing; means electrically insulating the conductive portion of the closure member from the battery, and a combination mounting and contact guide means, at least a portion of which is electrically conductive and in contact with the conductive portion of the closure member, the guide means leading to the end of the battery through the closure member and extending outwardly from the closure member away from the battery end for removably and slidably mounting the flashlight on a conductive tip carried by the signal arm of the rig, the guide means electrically contacting the tip by means of the conductive portion of the guide means and being so oriented relative to the flashlight that the flashlight slides downwardly on the signal arm when it is in the "bite" position bringing the end of the battery into electrical contact with the tip whereby an electrical circuit between the battery and bulb is completed and the bulb is energized.

2. The bite indicator light of claim 1 wherein the entire housing and entire closure member are electrically conductive.

3. The bite indicator of claim 1 in which the combination guide and contact means extends angularly from the battery end.

4. The bite indicator of claim 1 in which the guide and contact means comprises a conduit.

5. The bite indicator of claim 1 in which the closure member is an end-cap.

6. The bite indicator of claim 5 in which the guide and contact means is integral with the end-cap.

7. The bite indicator of claim 6 in which the guide and contact means comprises a conduit.

8. The bite indicator of claim 7 in which the conduit extends away from the end-cap at a slight angle to the longitudinal axis of the flashlight.

9. The bite indicator light of claim 2 wherein the entire guide means is electrically conductive.

10. A fish bite indicator light to be carried and energized by the signal arm of an ice fishing rig having a normal "baited" position and a substantially upright "bite" signaling position, the bite indicator comprising a flashlight including a housing having at least a portion thereof electrically conductive; a normally de-energized bulb electrically contacting the conductive portion of the housing; a battery in the housing cooperating with the bulb; means electrically insulating the housing from the battery; a combination mounting and contact guide means including a conductive portion electrically contacting the housing conductive portion, the guide means leading to the end of the battery through the housing and extending outwardly from the housing away from the battery end for removably and slidably mounting the flashlight on a conductive tip carried by the signal arm of the rig, the guide means electrically contacting the tip by means of the conductive portion of the guide means and being so oriented relative to the flashlight that the flashlight slides downwardly on the signal arm when it is in the "bite" position bringing the end of the battery into electrical contact with the tip whereby an electrical circuit between the battery and bulb is completed and the bulb is energized, and means insulating the guide means from the battery.

11. The bite indicator light of claim 1 wherein the entire housing and guide means are electrically conductive.

* * * * *

UNITED STATES PATENT AND TRADEMARK OFFICE
CERTIFICATE OF CORRECTION

PATENT NO. : 4,183,076
DATED : January 8, 1980
INVENTOR(S) : Egbert J. Bodde

It is certified that error appears in the above-identified patent and that said Letters Patent are hereby corrected as shown below:

Column 2, line 29, after "22" insert --which--.

Column 3, line 31, delete "portionof" and insert --portion of--.

Signed and Sealed this

Twenty-fifth Day of March 1980

[SEAL]

Attest:

SIDNEY A. DIAMOND

Attesting Officer

Commissioner of Patents and Trademarks